(12) United States Patent
Stollfus et al.

(10) Patent No.: US 6,321,258 B1
(45) Date of Patent: *Nov. 20, 2001

(54) ADMINISTRATION OF NETWORKED PERIPHERALS USING PARTICULAR FILE SYSTEM

(75) Inventors: Brennen W. Stollfus, Boise; Robert R. Eamon, Jr., Meridian, both of ID (US)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/988,854

(22) Filed: Dec. 11, 1997

(51) Int. Cl.⁷ ...................................................... G06F 15/16
(52) U.S. Cl. .......................... 709/220; 709/219; 709/220; 709/225; 709/230; 709/232; 709/203
(58) Field of Search ..................................... 709/217, 218, 709/219, 220, 225, 229, 230, 232, 201, 202, 203

(56) References Cited

U.S. PATENT DOCUMENTS

| | | | |
|---|---|---|---|
| 4,912,637 | * 3/1990 | Sheedy et al. | 364/300 |
| 4,980,780 | * 12/1990 | Tanaka | 358/401 |
| 4,999,654 | * 3/1991 | Maruo et al. | 346/160 |
| 4,999,766 | 3/1991 | Peters et al. | |
| 5,339,435 | 8/1994 | Lubkin et al. | |
| 5,537,550 | * 7/1996 | Russell et al. | 395/200.11 |
| 5,537,626 | * 7/1996 | Kraslavsky et al. | |
| 5,550,957 | 8/1996 | Davidson et al. | |
| 5,572,643 | 11/1996 | Judson | |
| 5,580,177 | * 12/1996 | Gase et al. | 400/61 |
| 5,586,304 | * 12/1996 | Stupek, Jr. et al. | |
| 5,602,993 | * 2/1997 | Stromberg | 395/200.1 |
| 5,611,046 | * 3/1997 | Russell et al. | |
| 5,636,333 | 6/1997 | Davidson et al. | |
| 5,655,148 | * 8/1997 | Richman et al. | 395/828 |
| 5,740,413 | * 4/1998 | Alpert et al. | 395/568 |
| 5,784,702 | * 7/1998 | Greenstein et al. | |
| 5,819,015 | * 10/1998 | Martin et al. | 395/114 |
| 5,819,107 | * 10/1998 | Lichtman et al. | 395/828 |
| 5,828,864 | * 10/1998 | Danknick et al. | 395/500 |
| 5,835,911 | * 11/1998 | Nakagawa et al. | |
| 5,867,714 | * 2/1999 | Todd et al. | |
| 5,881,236 | * 3/1999 | Dickey | |
| 5,898,823 | * 4/1999 | Sorkin et al. | |
| 5,901,286 | 5/1999 | Danknick et al. | |
| 5,905,906 | * 5/1999 | Goffinet et al. | 395/828 |
| 5,919,247 | * 6/1999 | Van Hoff et al. | 709/217 |
| 5,960,189 | * 9/1999 | Stupek, Jr. et al. | |
| 5,968,116 | * 10/1999 | Day, II et al. | 709/202 |
| 5,974,444 | * 10/1999 | Konrad | 709/203 |
| 5,987,511 | * 11/1999 | Elixmann et al. | |
| 6,003,075 | * 12/1999 | Arendt et al. | |
| 6,021,437 | * 2/2000 | Chen et al. | |

* cited by examiner

Primary Examiner—Robert B. Harrell
Assistant Examiner—Stephan Willett (57) ABSTRACT

A computer system having client workstations, a shared peripheral, and a web server on a local area network permits administration of the peripheral from the workstation. Administration includes initial installation of the peripheral, obtaining operating status, and reviewing periodic maintenance. The web server includes a general purpose administrator program and modular data files stored in predetermined directories. The administrator interprets modular data files for parametric values used to identify, query for status, and configure the peripheral without foreknowledge of its type. Modular data files conform to a file structure that includes conditional and inheritance expressions so that references to other modular data files and graphic files are resolved dynamically. In one variation, needed modular data files are obtained from the Internet when new or upgraded peripheral equipment is identified on the local area network.

46 Claims, 7 Drawing Sheets

| 316 | [register] |
| 318 | DeviceName = printer |
| 320 | DisplayName = HP LaserJet Family |
| 322 | DeviceClass = 0 |
| 324 | UpdateAfter = 1 Jan 2002 |
| 326 | [conditional] |
| 328 | panel1 = online1 |
| 330 | builtin1 = outtray1 |
| 332 | [capabilities] |
| 334 | outtray1 = $COMPARE(1.1.4.0, 0) 1, 0 |
| 336 | [graphics] |
| 338 | DeviceGIF = printer.gif |
| 340 | [status strings] |
| 342 | outtray1 = Output Paper Tray 1 is Full |

FIG. 3

```
                                           ┌─414
416┐  ┌─────────────────────────────────────────┐
   └──│ [register]                              │
418┐  ├─────────────────────────────────────────┤
   └──│ DeviceName   =  hplj5si                 │
420┐  ├─────────────────────────────────────────┤
   └──│ DisplayName  =  HP  LaserJet  5  Si     │
422┐  ├─────────────────────────────────────────┤
   └──│ DeviceClass  =  1                       │
424┐  ├─────────────────────────────────────────┤
   └──│ UpdateAfter  =  21  Jul  1998           │
426┐  ├─────────────────────────────────────────┤
   └──│ [conditional]                           │
428┐  ├─────────────────────────────────────────┤
   └──│ config1  =  $COMPARE(1.1.4.5,  2)  OR   │
430┐  ├─────────────────────────────────────────┤
   └──│ config2  =  $COMPARE(1.1.4.6,  2)  OR   │
432┐  ├─────────────────────────────────────────┤
   └──│ config3  =  $COMPARE(1.1.4.5,  3)  AND  │
434┐  ├─────────────────────────────────────────┤
   └──│ config4  =  $COMPARE(1.1.4.7,  5) intray1│
436┐  ├─────────────────────────────────────────┤
   └──│ INHERIT  =  printer                     │
438┐  ├─────────────────────────────────────────┤
   └──│ [capabilities]                          │
440┐  ├─────────────────────────────────────────┤
   └──│ online1  =  $COMPARE(1.1.9.2,  0)  1, 0 │
442┐  ├─────────────────────────────────────────┤
   └──│ intray1  =  $COMPARE(1.1.4.7.2, 0) 1, 0 │
444┐  ├─────────────────────────────────────────┤
   └──│ [graphics]                              │
446┐  ├─────────────────────────────────────────┤
   └──│ DeviceGIF  =  fullsize.gif              │
448┐  ├─────────────────────────────────────────┤
   └──│ DeviceICO  =  iconsize.gif              │
450┐  ├─────────────────────────────────────────┤
   └──│ online1  =  &  online1.gif              │
452┐  ├─────────────────────────────────────────┤
   └──│ intray1  =  &  intray1.gif              │
454┐  ├─────────────────────────────────────────┤
   └──│ [status  strings]                       │
456┐  ├─────────────────────────────────────────┤
   └──│ intray1  =  Input  Paper  Tray  1  is  Empty │
      └─────────────────────────────────────────┘
```

ADMINISTRATION OF NETWORKED PERIPHERALS USING PARTICULAR FILE SYSTEM

FIELD OF THE INVENTION

This invention relates to computer systems having networked resources and to methods for resource administration.

BACKGROUND OF THE INVENTION

In a conventional office, a local area network (LAN) typically connects several shared resources to several workstation computers. Due to the rate of advances being made in software and computer system equipment, the office system is subject to the frequent introduction of new products including software such as word processors and computer equipment such as color printers. The interfaces between software products and equipment are complex in order to support wide application. This complexity makes the installation and proper operation of all capabilities of each new product on the LAN a daunting task for the person responsible for system operations. Workstation users are equally burdened to learn and retain operational details related to the new products. The process of installing a resource, configuring a resource, and obtaining operating information related to a resource is conventionally called resource administration.

In general, resource administration for a new or upgraded product involves setting configuration values to be stored in memory. For a software product, such values are requested on installation screens and stored with the working copy of the product on mass storage. For a resource such as an input device (scanner, mouse, instrument, etc.), an output device (printer, plotter, audio/visual component, etc.), or an I/O device (modem, disk, robot, etc.) numerous settings are specified via front panel controls, installation screens, or specified in one or more files to be edited before being activated for use by the resource. The settings are typically stored in nonvolatile memory packaged with the resource, such as an integral disk drive or EEPROM.

General purpose installation screens for use with many product configurations are often confusing to the system operator. Generality often obscures the consequences of particular values of a configuration setting. On the other hand, tailored installation screens for interoperable resources and software are particularly helpful when they include graphic images to which the system operator can associate information.

For a conventional installation or upgrade, a resource vendor, such as a printer manufacturer, supplies configuration software on removable media with the printer. The configuration software typically includes installation screens and graphic images created to match the functions and appearance of the printer. When the printer is to be upgraded or replaced, a new complement of configuration software must be installed.

Configuration software is difficult to consistently prepare and difficult to distribute and install. Preparation is made difficult by the numerous combinations of alternate functions and alternate packaging that change the appearance of the printer. Distribution of the software must be synchronized with distribution of the printer. And, installation is difficult because the new complement of configuration software may not operate correctly when components of prior configuration software are not deleted during the installation of new software.

A conventional resource administration approach provides a setup program executable file (EXE) developed to cooperate with dynamic link library files (DLLs). Installation screens and graphic images are conventionally embedded in such DLL files and accessed by specific references from the EXE files. If a DLL should require modification by the resource vendor, then the EXE is conventionally redeveloped to assure all specific references are updated in concert with the modification. Maintaining consistency among the EXE and DLL files is difficult and costly.

In view of the problems described above, the need remains in computer systems having networked resources for improved systems and methods of resource administration.

SUMMARY OF THE INVENTION

Accordingly, a computer system in one embodiment of the present invention includes a resource and a workstation. The resource provides a message in response to an address. The workstation is coupled to the resource for data communication. The workstation includes a file system having a named file and an administrator program. The named file includes a data structure including the address and a conditional expression. The administrator is executable by the workstation and is developed independently of the filename and the data structure. The administrator sends the address to obtain the message, evaluates the conditional expression in response to the message, and reports status of the resource in response to the evaluation.

According to a first aspect of such an embodiment, independent development of the administrator program permits distribution of replacements for the file without replacement of the administrator program. Further, additional and interrelated files are added in an alternate variation without replacement of the administrator program.

A prerecorded data storage medium in another embodiment of the present invention includes a data storage medium and machine readable indicia recorded on the medium. The indicia include a file system, a data structure, and a file. The file system includes a first filename and a second filename. The data structure, identified by the first filename, supplies an external parameter and an address to a provided machine executable program for obtaining a message from a resource at the address. The program is developed without foreknowledge of the external parameter. The file, identified by the second filename, supplies to the program a description of a status of the resource. The second filename is identified by the external parameter in response to the message. The program reports the status responsive to the description.

According to a first aspect of such an embodiment, the program is independent of both the data structure and the file, allowing the data structure and the file to be revised and replaced without the need to revise or replace the program. Expansion of system level capabilities is thereby less likely to introduce errors into system functions that existed prior to the expansion.

A prerecorded data storage medium in yet another embodiment of the present invention includes a data storage medium and machine readable indicia recorded on the medium. The indicia include a file system, a first data structure, a second data structure, and a file. The file system includes a first, a second, and a third filename. The first data structure, identified by the first filename, supplies a first external parameter to a provided machine executable program for determining the second filename. The program is developed without foreknowledge of the first external parameter. The second data structure, identified by the second filename, supplies a second external parameter and an address for obtaining a message from a resource at the address. The file, identified by the third filename, supplies to the program a description of a status of the resource. The third filename is identified by the second external parameter in response to the message. The program reports the status responsive to the description.

According to an aspect of such an embodiment, references from the first data structure to the second data structure simplify development of the second data structure.

BRIEF DESCRIPTION OF THE DRAWINGS

A preferred exemplary embodiment of the present invention is described below with reference to the drawing in which.

DETAILED DESCRIPTION OF THE PREFERRED EMBODIMENT

Figure 1:
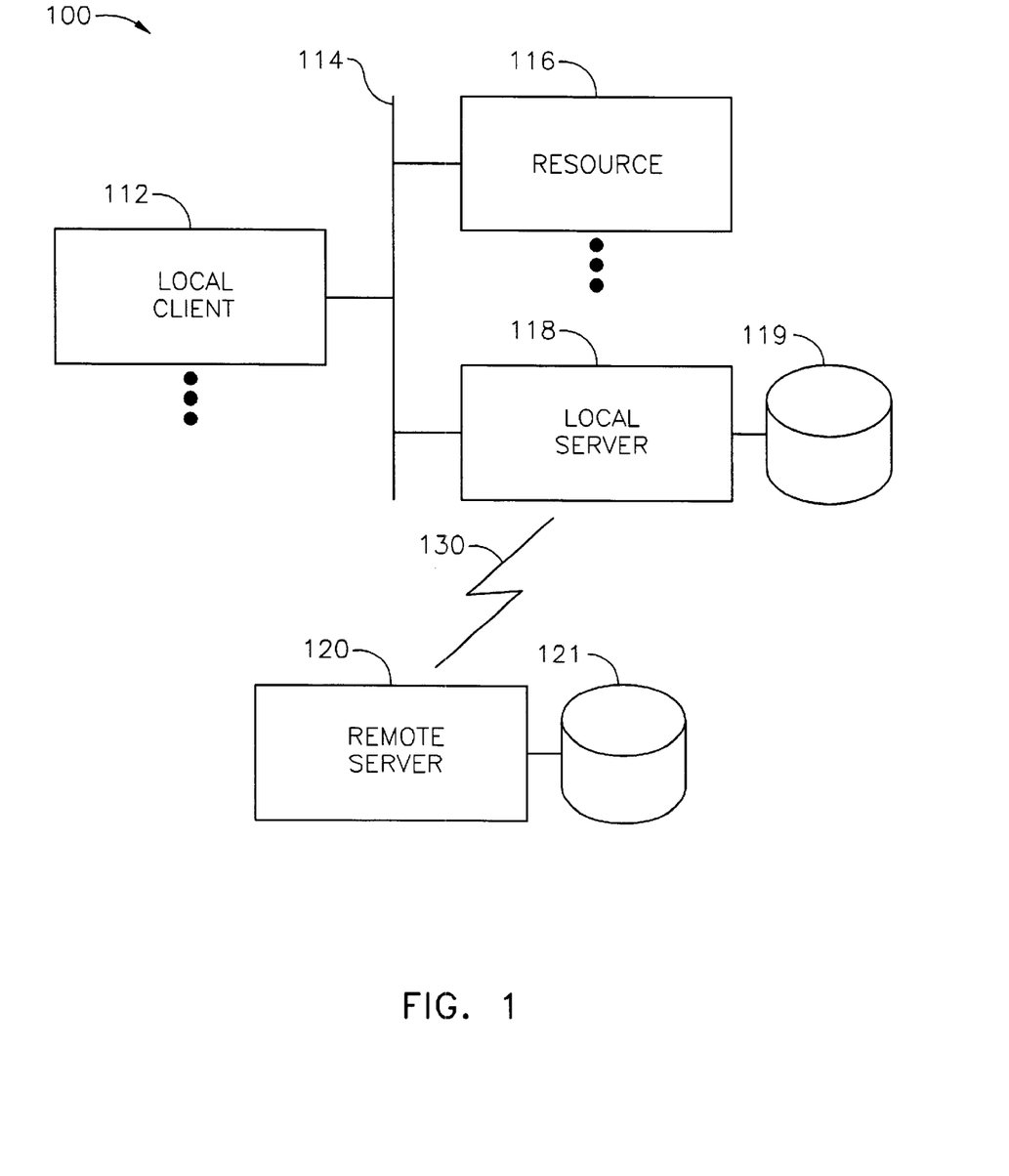
FIG. 1 is a block diagram of a computer system in one embodiment of the present invention.

FIG. 1 illustrates computer system 100 for the purpose of describing various aspects of the present invention, including the capability to present the status of a new or upgraded resource on a local client workstation without requiring a new version of an administrator program running on a local server.

A computer system of the present invention includes one or more workstations, one or more resources, and one or more servers cooperating via network links. For example, computer system 100 includes local client workstation 112, network 114, resource 116, local server 118, communications channel 130, and remote server 120.

Network links are of any type supporting data communication. For example, network 114 is a conventional network such as a wide area network, a local area network, or a network compatible with the world wide web. Any of various protocols accomplish data communication including for example Ethernet, token ring, or packet switched technologies. A conventional packet protocol for passing data communication messages is supported in computer system 100 by conventional circuits, firmware, and software residing in local client 112, resource 116, local server 118, and remote server 120.

A client workstation is a computer system that permits a user to send and receive information over a network. For example, local client 112 includes a conventional workstation having a conventional operating system, browser, and word processor. The operating system, for example, is of the type known as Windows NT marketed by Microsoft. The browser, for example, is of the type known as Navigator marketed by Netscape. Local client 112 represents one of possibly many workstations, joined similarly to network 114 for cooperation according to the conventional peer-to-peer or conventional client-server computing models. In each of these models, local client 112 shares access to one or more resources represented by resource 116.

A resource is any computer peripheral device capable of communication via a network. Some peripheral devices are primarily input devices (e.g. a scanner, a camera, or a measurement instrument), others are primarily output devices (e.g. a printer, a plotter, or an audio/visual component), while still others have input and output capability (e.g. a modem, a data storage disk system or tape system, or a robot). In all cases, the resource both sends and receives messages over a network. Resource 116, for example, is a printer of the type marketed by Hewlett-Packard as model HP LaserJet 5 Si which receives messages from network 114 that identify configuration settings and sends messages over network 114 that identify operating status.

Local client 112 cooperates with resource 116 in a conventional manner. For example, when local client 112 is executing a conventional word processing program, for example, Word marketed by Microsoft, the user of local client 112 can direct printing of a document. Information sufficient to print the document is provided by the word processing program, managed in a queue by the operating system in local client 112, and communicated to resource 116 (in this case a printer) using conventional network hardware and software in both local client 112 and resource 116 (the printer in this case). Status of print jobs in the queue is conventionally provided by the operating system on local client 112; however, according to the present invention, status of the printer (e.g. whether paper is available, a paper jam has stopped printing, etc.) is provided by cooperation of local client 112, resource 116 and local server 118.

A file server is any computer system that includes local data storage for sending and receiving files over a network. For example, disk system 119, coupled to local server 118, stores files for local server 118. Similarly, disk system 121, coupled to remote server 120, stores files for remote server 120. Local server 118 includes a conventional operating system, for example, of the type known as Windows NT, marketed by Microsoft; web site server software, for example, of the conventional type compliant with Hypertext Transfer Protocol (HTTP); and an administrator program according to various aspects of the present invention.

Local server 118 and local client 112 communicate using HTTP in a conventional manner wherein the web browser on client 112 identifies a uniform resource locator (URL) to the web site server on local server 118 and, in response, the web site server provides a "page" compliant with the Hypertext Markup Language (HTML). Such communication is of the type described in U.S. Pat. No. 5,572,643 to Judson, incorporated herein by reference. According to one aspect of the present invention, status of resource 116 is provided in a page formatted in HTML.

Local server 118 and remote server 120 cooperate in any conventional manner accomplishing file transfer. Files to be transferred for storage on disk system 119 originate on disk system 121. For example, (a) local and remote servers 118 and 120 each include a file transfer program, (b) local and remote servers cooperate in a manner similar to the cooperation of local client 112 and local server 118 as described above, or (c) local and remote servers 118 and 120 each support connection to the Internet. In this latter example, file transfer is accomplished by the known protocol TCP/IP and messages transferred between local server 118 and remote server 120 are compliant with HTTP as described above.

An administrator, or administrator program, is any computer program that assists a user of a computer system to install, reconfigure, upgrade, manage, or monitor operation of a resource. For example, an administrator program on local server 118 has access to files stored on disk system 119 and communicates with all resources including resource 116 via network 114. This administrator program, on request from the user of local client 112, accesses disk system 119 and communicates with resource 116 to provide a status message in HTML to local client 112. In addition, this administrator program includes a conventional file transfer capability to facilitate communication with remote server 120 via communication channel 130. In addition, files obtained via the file transfer capability upgrade operation of system 100 when stored on disk system 119 without further user intervention.

Files used by the administrator are stored on disk system 119 in any manner facilitating grouping of files and association of particular files with a particular resource. In addition, the file system of the present invention serves to associate files that make up the administrator program itself with the files used by the administrator. For example, file system 200 of FIG. 2 includes PROGRAMS directory 202, ADMIN directory 204, ADMIN_LIB directory 210, printer directory 212, hplj5sl directory 218 and possibly other directories 234. These directories are related in a conventional hierarchical manner. The names of files, names of directories, and descriptions of the interrelation between files and directories are stored on disk system 119 as prerecorded machine readable indicia of a hierarchical file system. Many machine readable indicia recording formats and recording methods are known for accomplishing the tree-like hierarchy of file system 200 such as those provided by operating systems MSDOS or Windows NT, both marketed by Microsoft. Such indicia are recorded on a data storage medium, for example a conventional magnetic disk of disk system 119. In variations of the present invention, such data storage media includes, for example, magnetic disk, magnetic tape, optical disk, compact disk read only memory (CDROM), and various known semiconductor memory device circuits providing, for example, nonvolatile memory accessed as if it were a disk system.

Figure 2:
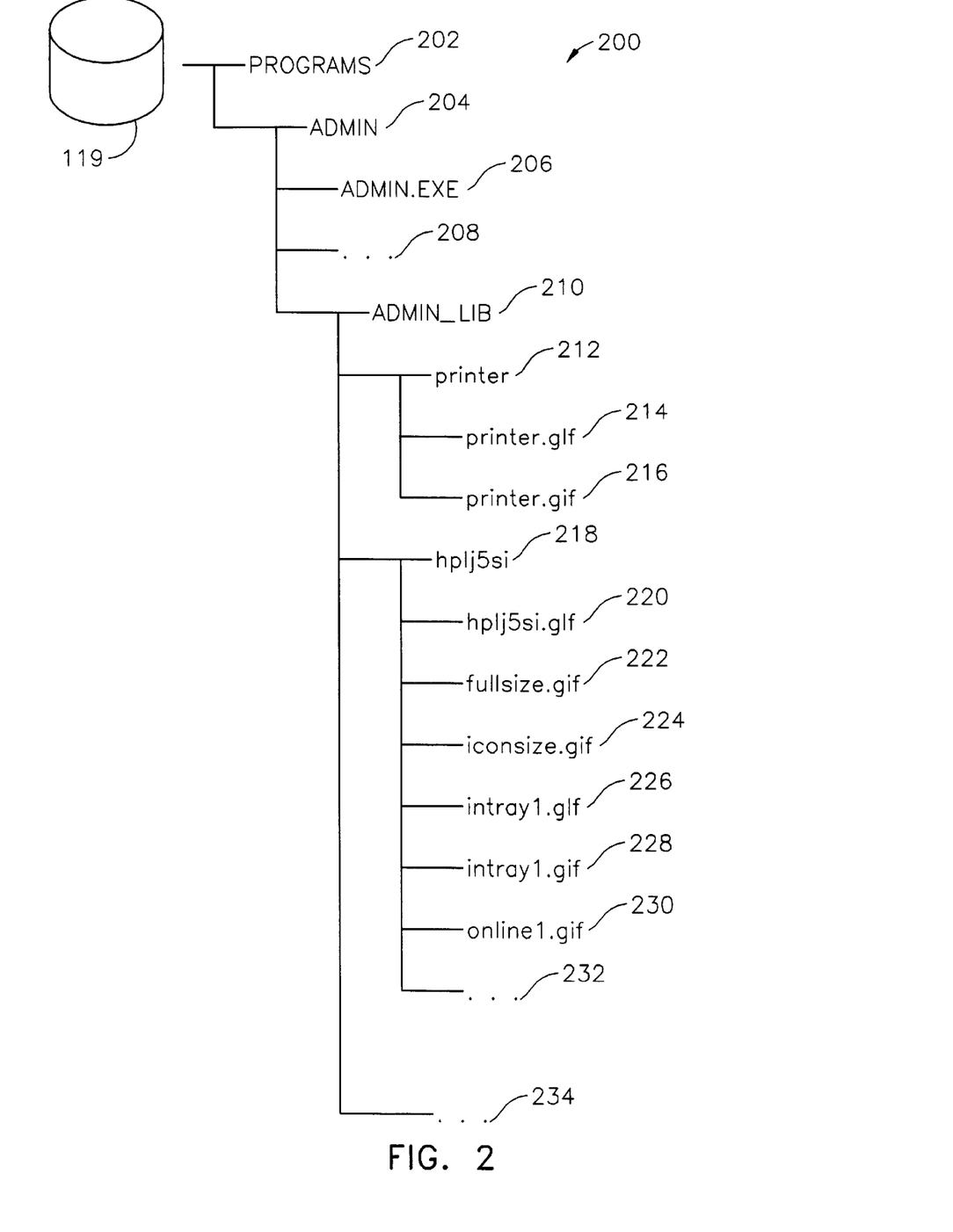
FIG. 2 is a tree diagram illustrating hierarchical relations between files stored on a disk system of FIG. 1.

In file system 200, the operating system locates executable programs with reference to a PROGRAMS directory 202, having subdirectories for particular programs such as ADMIN directory 204 and other directories at this level, not shown. ADMIN directory 204 includes executable ADMIN-.EXE file 206 (hereinafter called administrator 206, whether stored or being executed) and any other files, indicated generally as files 208, related to program execution, such as dynamically linked library files (DLLs). Administrator 206 is programmed to search for files to be used in a subdirectory named ADMIN_LIB. ADMIN_LIB directory 210 is a member of the same directory where administrator executable files are located, simplifying access to this subdirectory from administrator 206.

In file system 200, files to be associated with a resource are stored in a directory named for the resource. For example, hplj5si directory 218 includes files for use by the administrator for a resource 116 being a Hewlett-Packard LaserJet 5 Si printer. Resource 116 identifies itself with a character string from which the string hplj5si is derived. As a second example, printer directory 212 includes files for use by the administrator for a generic resource. Information files needed during execution of administrator program file ADMIN.EXE 206 are stored in an administrator library subdirectory ADMIN_LIB 210. Files in the library are grouped by resource with all files for each resource in a directory bearing the resource device name. For example, files for a default generic printer device are stored in printer directory 212. Files for a particular laser printer known as the HP LaserJet 5 Si marketed by Hewlett-Packard Co. are stored in hplj5si directory 218. Similarly, files for other devices, not shown, are stored in additional subdirectories indicated as 234.

Information related to a particular type of resource is stored in a file or files independent of the files comprising the administrator. According to an aspect of the present invention, such information is stored in part in a data structure having records. Files which include such a data structure are identified to the administrator in any convenient manner. For example, files stored in administrator library directory ADMIN_LIB 210 are of various types, identified by the respective file extension. For example, files with extension ".gif" contain a graphics image in the known graphics format made popular by World Wide Web service provider CompuServe. Files with extension ".glf" (resource information files) contain information particular to a resource in a data structure as described below.

Figure 3:
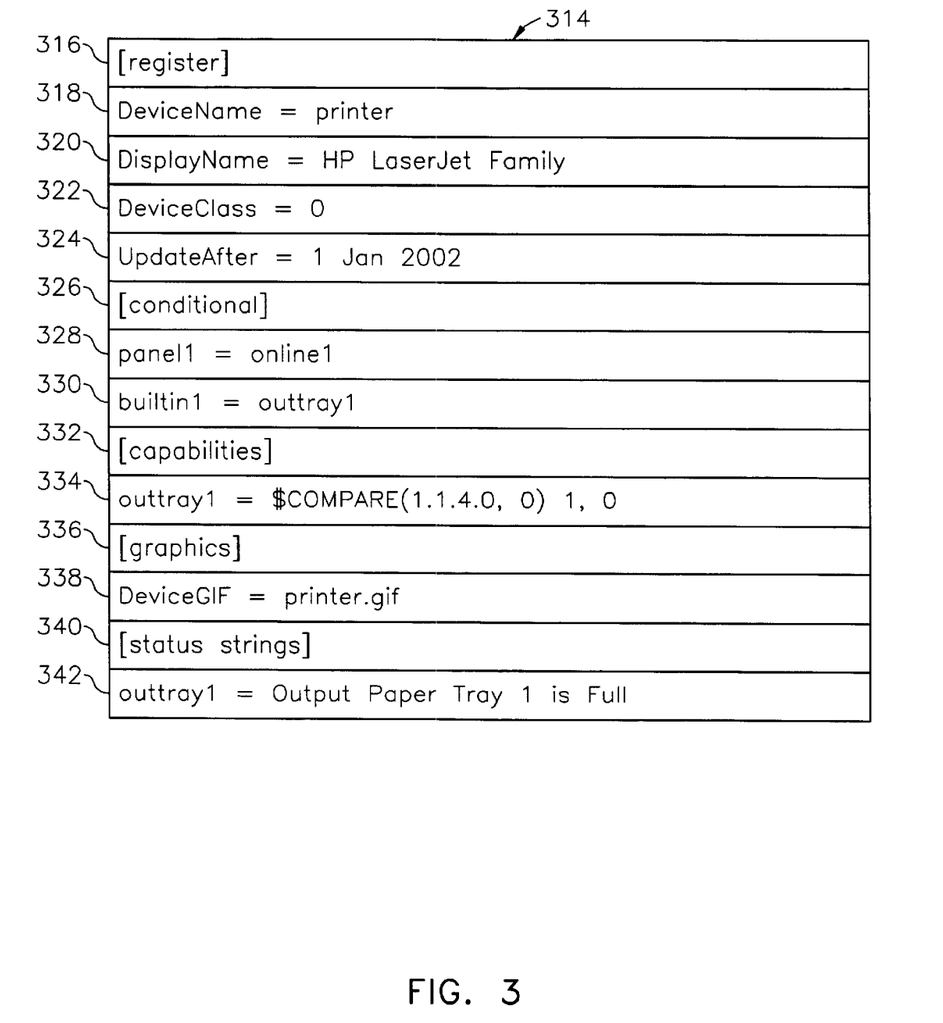
FIG. 3 is a data structure diagram of the contents of file printer.glf shown in FIG. 2.
Figure 4:
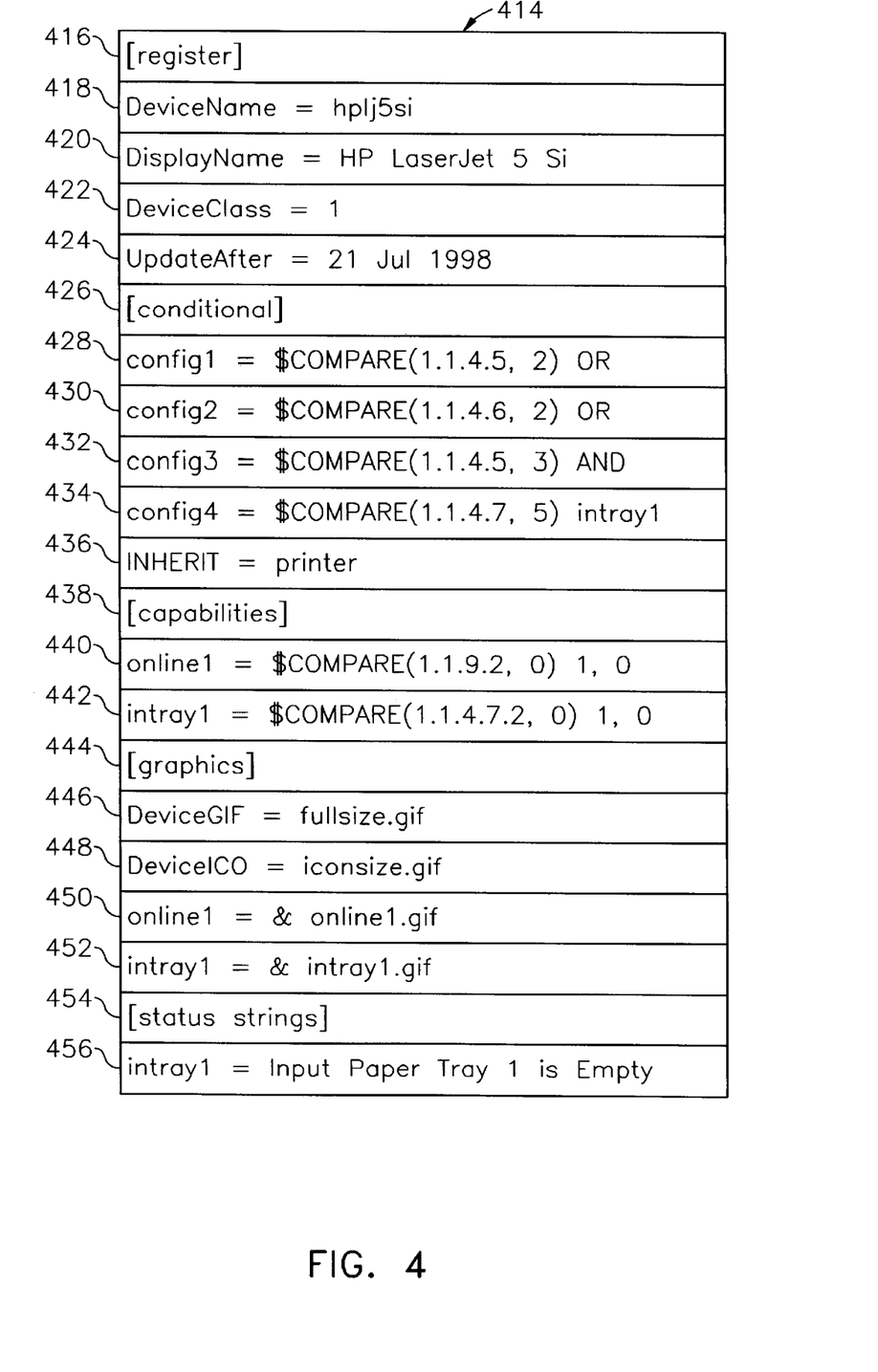
FIG. 4 is a data structure diagram of the contents of file hplj5si.glf shown in FIG. 2.

A data structure of the present invention is any data structure describing a particular resource that is compatible with the functions of an administrator program. A compatible data structure includes information facilitating communication with the resource for identification, installation, reconfiguration, or monitoring operation. For example, data structures 314 and 414 of FIGS. 3 and 4 are included in the machine readable indicia of printer.gif file 214 and hplj5si.glf file 220 respectively. Each data structure includes records illustrated as lines of text. Data structures 314 and 414 include records 316 through 342 and 416 through 456 respectively. Each record includes characters in the known ASCII code. Records are terminated with the known CRLF sequence. In variations, other machine readable character codes are used, for example, character sets that support foreign languages and token sets resulting from compilation or data compression algorithms. In still further variations, other record terminator codes or conventions are used.

Data structures of the present invention permit access by the administrator in several ways. For example, data structures 314 and 414 provide record access in conventional fixed length or variable length record formats; or serial access (i.e. sequential access), as used conventionally with sequential (i.e. text) files. Heading records 316, 326, 332, 336, 340, 416, 426, 438, 444, and 454, are syntactically identified by the use of surrounding bracket characters, and divide each data structure 314 and 414 into named sections. Quick access to a particular section is accomplished by searching data structure 314 or 414 characters in series for the bracket characters. In variations, other syntactic devices divide the data structure into sections. The use of brackets and key words as in FIGS. 3 and 4 is preferred for ease of creating a human readable version and therefore minimizes the risk of error.

Symbols used in each data structure 314 and 414 simplify syntactic analysis. Parameter names appear in mixed upper-lower case with at least a leading uppercase letter as in "DeviceName" in records 318 and 418. Reserved words appear in upper case as in "OR", "AND", and "INHERIT" in records 428, 430, 432, and 436. Reserved words followed by parameter lists in parentheses begin with a dollar sign character, as in "$COMPARE" in records 428, 430, 432, 434, 440, and 442.

Data structures 314 and 414 permit quick access to a particular parametric value. Each named parameter appears at the beginning of a record and precedes an equals sign, "=". If a sought parameter name does not match the first portion of a particular record, the balance of the record can be skipped and the search continued on the next record.

A heading is any symbol or group of symbols that identify the context of a group of records, called a section. Use of headings and sequential searching permits sections of data structures 314 and 414 to be written in any convenient sequence. In addition, the search technique and data structure organization provide compatibility in that new headings and sections will not cause older versions of administrator 206 to exhibit abnormal behavior because such headings and sections will be ignored.

A parameter is any symbol or group of symbols that identifies or conveys a particular value to be used by an administrator. Generally, if administrator 206 relies on foreknowledge (i.e. during development of a administrator 206) of the name of a particular parameter, that parameter is considered internal. For example, administrator 206 anticipates finding the filename of the data structure as parameter DeviceName, an internal parameter, as in records 318 and 418. The number of internal parameters is preferably minimal. On the other hand, when administrator 206 can properly communicate with resource 116, local client 112, and remote server 120 as in FIG. 1 without foreknowledge of a parameter, that parameter is considered external.

For administrator 206, parameters serve several functions. Some parameters provide intermediate values for conditional expressions that are set out on multiple records, as in data structure 414 records 428 through 434. Some parameters link information between records of the same data structure, for example as in "intray1" which links records 434, 442, and 456 in data structure 414. Some parameters also link one data structure to another as in the reference to data structure 314 in printer.glf file 214 appearing in record 436 of data structure 414 in hplj5si.glf file 220.

Software development activities are avoided or simplified as a result of the present invention. The cost and distribution of updated versions of administrator 206 is avoided when use is made of external parameters. For example, no updated administrator is needed when support is needed for capabilities added to existing resources or when support is needed for new resources.

Reference to separately developed resource information files simplifies each data structure in several ways. FIG. 4 illustrates several examples. First, consider record 436 of FIG. 4. Here, all information previously prepared and debugged in printer.glf file 214 for a generic printer is identified as applicable in the context of hplj5si.glf file 220. Administrator 206, when searching for all capabilities of the hplj5si resource, is directed by the keyword "INHERIT" to also search printer.glf file 214 to find online1 and outtray1 at records 328 and 330. Second, consider record 448 of FIG. 4. Here, rather than incorporating a graphic image directly into data structure 414, reference is made to fullsize.gif file 222 for such an image. In the event that the image is to be updated, neither administrator 206 nor any resource information file need be revised. Finally, consider record 450 of FIG. 4. Here, a graphic image in online1.gif file 230, is identified by the "&" prefix as an overlay image to be combined with fullsize.gif file 222, identified by internal parameter DeviceGIF in record 446. In this case, the overlay adds the color associated with an illuminated on-line indicator on the front panel of the full size image. In alternate variations, other status indications are independently added by additional overlays, each in a separately developed file.

A method of the present invention includes the capability to present the status of a new or upgraded resource on a local client workstation without requiring a new version of an administrator program running on the local server. For example, method 500 of FIG. 5 operates with system 100 of FIG. 1 wherein a browser program and a word processor program are executing on local client 112, resource 116 is a Hewlett-Packard LaserJet 5 Si printer, an additional second resource (not shown in FIG. 1), remote server 120 is available for dial-up file transfer services, and local server 118 is initially executing a web server program with access to file system 200 described in FIGS. 2, 3, and 4 on disk system 119.

Figure 5:
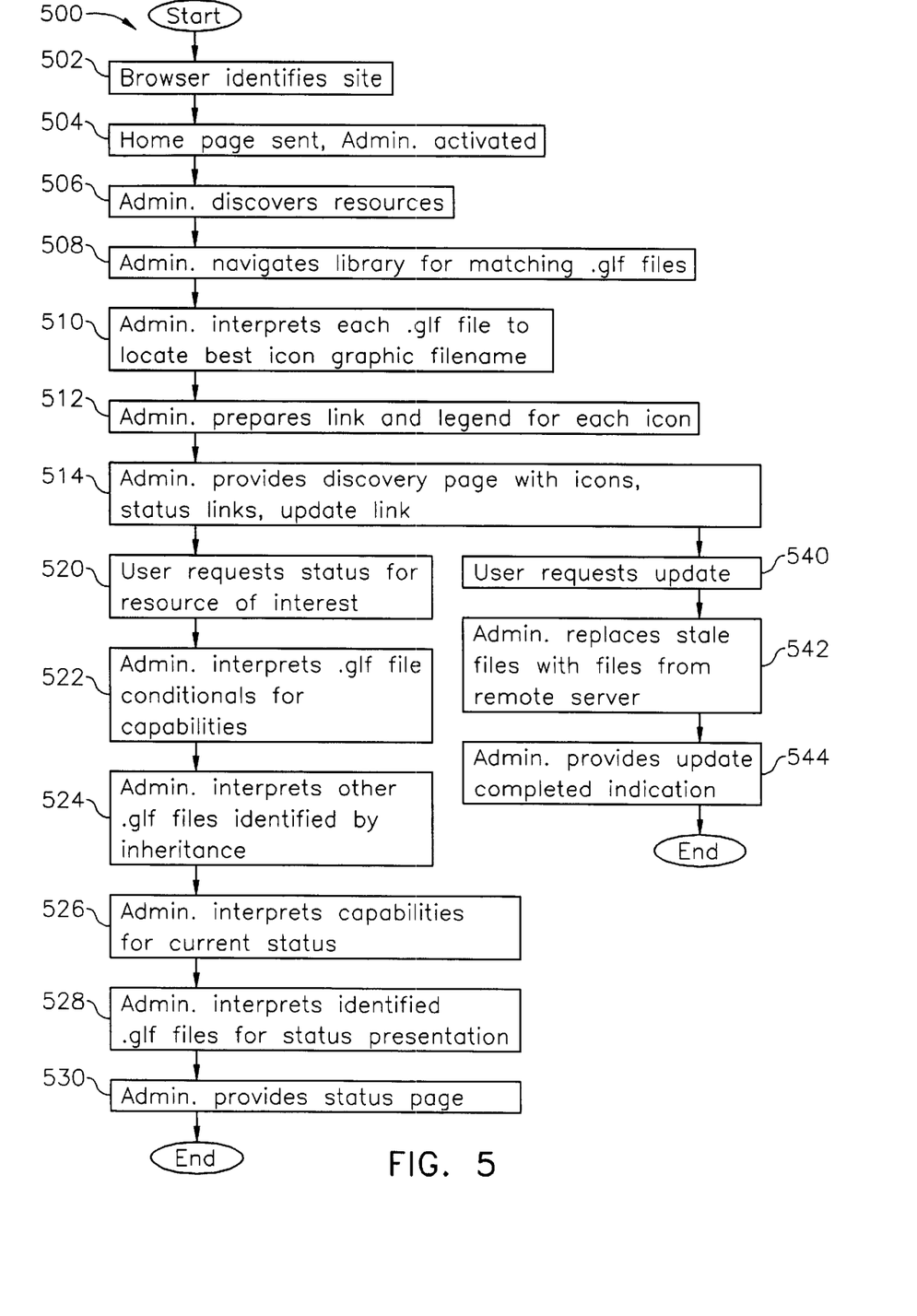
FIG. 5 is a flow chart of a method in one embodiment of the present invention.

At step 502, a user of local client 112 desires status of a network resource, particularly the HP LaserJet 5 Si to which, in this example of method 500, he has queued a print job from the word processor. To receive a status display on local client 112 according to various aspects of the present invention, the user causes the browser, in a conventional manner, to send a message requesting receipt of a web site Home page from which (a) administrator 206 can be activated by manually following an HTML link in that web site Home page, or (b) administrator 206 is automatically activated simply by the request for transferring that web site's Home page to local client 112. Activation of administrator 206 from an HTML file is conventionally accomplished via the known Common Gateway Interface (cgi).

At step 504, the web server executing on local server 118 has responded to the browser with a message (a file in HTML) containing the Home page and has activated administrator 206, now running in cooperation with the web server on local server 118. In steps 506 through 514 another file in HTML is prepared by administrator 206 for directing the browser to present Discovery page 600 of FIG. 6.

At step 506, administrator 206 attempts to discover the identity (IP address, IPX address, etc.), make (Hewlett-Packard, etc.), type (printer, plotter, etc.), and model (model number, part number, device name, etc.), of each resource currently coupled to network 114. In one variation, administrator 206 relies on known calls of the operating system on local server 118. In another variation wherein that operating system is Windows NT, such calls are included with the Windows NT Application Program Interface (API) marketed by Microsoft. In a preferred embodiment, administrator 206 broadcasts a request for all devices to identify themselves and receives a message from each resource. Each message includes an identification string used by administrator 206 to locate a matching resource information file. The identification string in one variation is manipulated using conventional string operators to develop a result string consistent with file naming conventions.

In this example, assume that both the HP LaserJet and the second device responded to a broadcast, the message from the HP LaserJet included the string "hplj5si", and the message from the second device included the string "bjp266g".

At step 508, administrator 206 considers each directory under ADMIN_LIB 210 in FIG. 2 to find a directory having a name that matches the identification string or result string of step 506. In this example of method 500, directory 218 is located and hplj5si.glf file 220 is identified as a resource information file matching the Hewlett Packard LaserJet 5 Si printer that responded to the broadcast message of step 506. A directory corresponding to "bjp266g" is not located.

Figure 6:
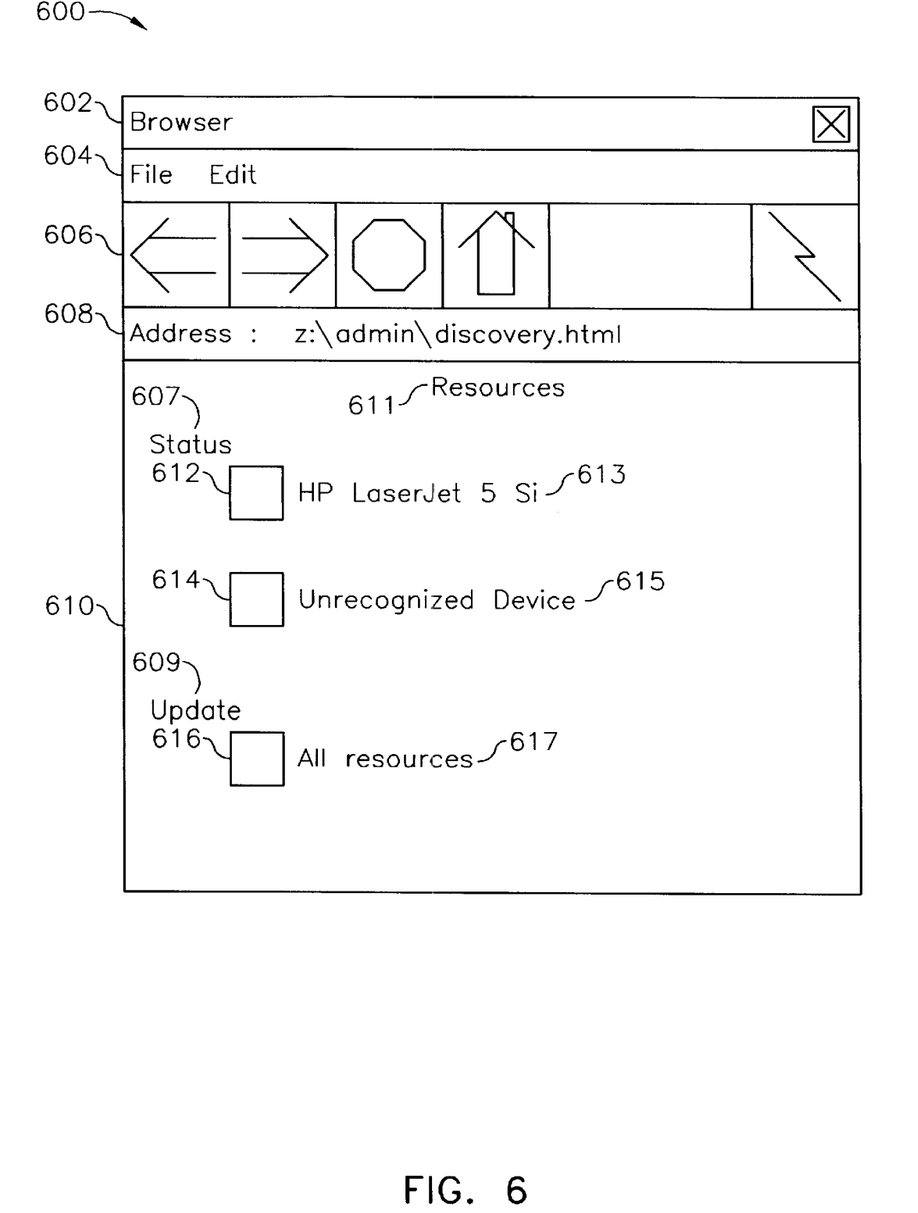
FIG. 6 is a schematic screen image provided at step 514 of the method of FIG. 5.

At step 510, administrator 206 interprets the resource information file for each resource to locate a graphic file name having an image to be used as an icon on Discovery page 600. For the hplj5si.glf file 220, administrator 206 searches for the "[graphics]" heading in record 444, and then the "DeviceICO" internal parameter in record 448 to identify iconsize.gif file 224 as the appropriate filename for icon 612. A similar search is performed in the resource information file for each resource identified in step 508. When, as for the second device, no matching directory is located, an internal default icon 614 is identified.

At step 512, administrator 206 prepares, for each resource, a legend and an HTML link to be included in the Discovery page. For hplj5si.glf file 220, administrator 206 searches for the "[register]" heading in record 416 and then the "DisplayName" internal parameter in record 420 to identify the string for legend 613. For the second device, a default string is identified for legend 615. Each link, when activated, will invoke execution of a portion of administrator 206 either to obtain and present status for the associated resource, or to process an unrecognized device for which possibly no status can be obtained. At step 514, administrator 206 sends an HTML file to local client 112. Consequently, Discovery page 600 is presented by the browser executing on local client 112 in response to the HTML file received. The presentation includes conventional window title bar 602, conventional menu bar 604, conventional tool bar 606, conventional URL address bar 608 showing the Discovery page's HTML filename, and a region 610 containing administrator 206 output. Region 610 includes title text 611; status subtitle 607; icons 612 and 614 as identified in step 510; and legends 613 and 615 for each icon. A link for each icon 612 and 614 is available for the user to follow if so desired. Other features of Discovery page 600 are described below with reference to step 540.

At step 520, in response to viewing Discovery page 600, the user of local client 112 requests status for a resource of interest, in this example, by following the link associated with icon 612. In steps 522 through 530 yet another file in HTML is prepared by administrator 206 for directing the browser to present Status page 700 of FIG. 7.

At step 522, administrator 206 interprets data structures 414 and 314 to identify all installed capabilities having status to be reported. First, internal parameter DeviceClass is found at record 422 with a value indicating status that can be reported. A value of zero corresponds to legacy equipment and other equipment having no status that can be reported. Other values permit upward compatible future expansion of functions of administrator 206.

Administrator 206 evaluates records 428 through 434 as one multirecord conditional expression to determine whether the resource responding as an HP LaserJet 5 Si, in addition to factory standard features, includes a high capacity input paper tray (an optional feature for this model). This determination is made by interpreting each record for a boolean result and combining the records according to boolean logic operators. The logic of this multirecord expression is equivalent to the statement: obtain status for an "intray" feature only if the expression {"config1" OR "config2" OR ("config3" AND "config4")} is TRUE.

In this example, each record 428 through 434 includes a function call to the $COMPARE function. The $COMPARE function takes two parameter values listed in parenthesis. The first parameter ("1.1.4.5" in record 428) is a string expression that identifies a communication address in the printer. To interpret this $COMPARE function, administrator 206 requests information from the designated printer communication address. If the response corresponds to the second parameter ("2" in record 428), then the $COMPARE function returns a "TRUE" result, otherwise a "FALSE" result is returned.

Administrator 206, on evaluation of a $COMPARE function of a multirecord expression and the connecting logical operator at the end of each record, will (a) continue in record by record evaluation or (b) skip ahead to the next record whose result is able to affect the overall result of the multirecord expression. For example, if record 428 evaluates to "TRUE", records 430 and 432 cannot change the overall result that this particular printer has the "intray" capability. If records 428 through 432 evaluate to "FALSE", then record 434 can be skipped. In alternate variations, conventional techniques for expression reordering are used to increase interpretation speed.

Administrator 206 proceeds with interpretation through all records of the "[conditional]" section. A second single-record or multirecord expression would be set out in records following record 434 using another sequence of external parameter names such as "comm1", "comm2", etc.

At step 524, administrator 206 interprets record 436 to follow a reference to an inherited resource information file (printer.glf file 214). In data structure 314 of file 214, two nonconditional assertions at records 328 and 330 indicate capabilities of all printers in the HP LaserJet family. No further inherited resource information files are referenced from data structure 314. Consequently, administrator 206 returns to record 438 in data structure 414 to conclude that all conditional capabilities have been evaluated. In alternate variations of data structures 314 and 414, multiple "INHERIT" directives are set out on separate records and can be freely intermixed between conditional expressions. At step 526, administrator 206 interprets the "[capabilities]" sections of all applicable data structures to determine the current status of each installed capability having status to be reported. The conditional expressions used in the "[capabilities]" section of a data structure generally include a boolean function followed by an "else" result, a comma, and a "then" result. The boolean function itself is a conditional expression. In operation, when the boolean function $COMPARE at record 440 returns "FALSE", indicating that the printer's response to an on-record inquiry did not match "0" (the second parameter in the $COMPARE function call) then the "online1" external parameter obtains the "else" result, namely "1", indicating that the printer is online.

Capabilities not installed are ignored as a beneficial consequence of the sequential search access to data structure 414. If at step 522 the intray1 capability was determined not to be installed, no search for the intray1 external parameter in sections 438, 444, or 454 would be attempted.

Figure 7:
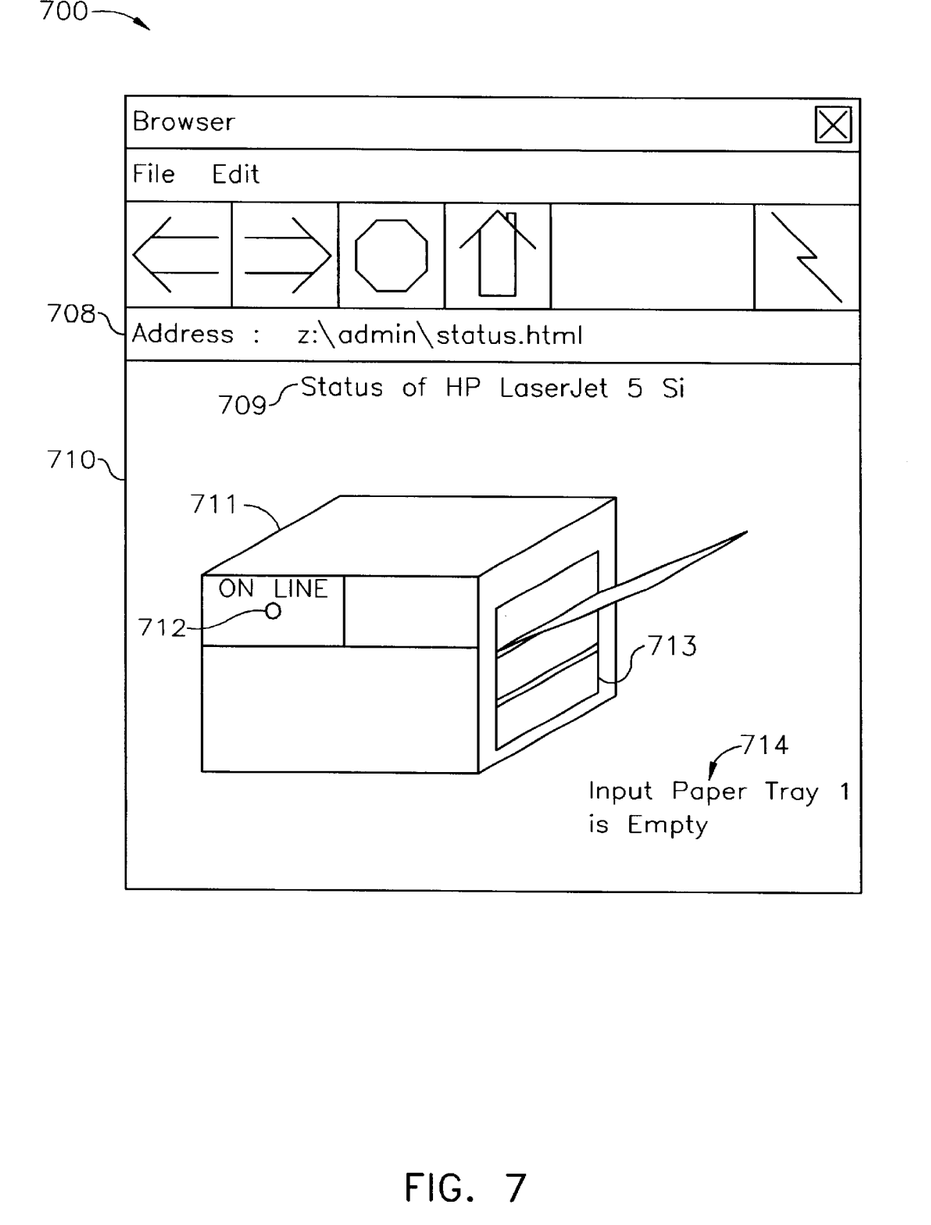
FIG. 7 is a schematic screen image provided at step 530 of the method of FIG. 5.

At step 528, administrator 206 interprets "[graphics]" and "[status strings]" sections of all applicable data structures to prepare an HTML file conveying status information. For the sake of example, the installed features include intray1 (record 434), online1 (record 328), and outtray1 (record 330); and it has been determined at records 442, 440, and 334, respectively, that the current status of only the intray1 and online1 features differs from the default condition. In this instance a default condition does not require a text message to appear on Status page 700 nor a change in the graphic images appearing on Status page 700.

At step 530, administrator 206 sends the resulting HTML file to local client 112, enabling the browser to display status to the user. Status page 700 of FIG. 7 is presented by the browser. Status page 700 includes conventional URL address bar 708 showing the Status page's HTML filename, and a region 710 containing administrator 206 output. Region 710 includes title text 709 derived from DisplayName at record 420, a full size graphic image 711 of the resource from fullsize.gif file 222 identified by internal parameter DeviceGIF in record 446, an on-line overlay graphic image 712 from online1.gif file 230 identified by external parameter online1 at record 450, and an input tray overlay graphic image 713 from intray1.gif file 228 accompanied by text message 714 identified by external parameter intray1 in record 456.

File system 200 is somewhat independent of the content of resource information files. In other words, ".gif" files may be added to file system 200 at any position and at any time without affecting operation of administrator 206. For example, a data structure for the intray1 feature as in intray1.glf file 226 appears in file system 200 but does not affect operation of administrator 206. Likewise, a corresponding graphic file for the outtray1 feature does not appear in file system 200. Without reference to such files from records of data structures 314 and 414, such inconsistencies in file system 200 cause no abnormal operation. The absence of such references provides an example of the update operation of administrator 206.

At step 540, in response to viewing Discovery page 600, the user of local client 112 requests an update of file system 200 by following the link associated with icon 616 identified by subheading 609 and legend 617. Administrator 206 includes internal definitions for subheading 609, icon 616, legend 617, and the link. The user need not initiate an update when, as in one variation, file system 200 includes support for all existing configurations of all expected resources. In such a case when a resource is modified to add additional installed features or additional resources are added to network 114, accurate and complete status for existing, modified, and added resources is provided automatically by operation of administrator 206 as is apparent from the above description. For this example, however, an update is requested either (a) by the user, possibly at the advice of a resource manufacturer, or (b) in an alternate variation, automatically on the lapse of a predefined time period, possibly set in conjunction with a periodic maintenance schedule.

At step 542, administrator 206 establishes communication channel 130 to remote server 120 having disk system 121. Local server 118 and remote server 120 cooperate using file system maintenance techniques to determine (a) whether files on disk system 119 are stale, i.e. out of date and in need of replacement or deletion, (b) what files are to be transferred by file transfer protocol to disk system 119, and (c) in what sequence the files are to be transferred so as to avoid abnormal operation of administrator 206 in the event that communication channel 130 fails during the sequence of file transfers. File system maintenance techniques include comparison of information kept with each file such as date created, date last modified, date last accessed, and file size (indicating file integrity). In addition each data structure, in the illustrated embodiment, includes internal parameter UpdateAfter as in record 324 and 424. The date value of the UpdateAfter parameter is used by administrator 206 to speed the update procedure, restricting file transfers to only those files whose UpdateAfter date value precedes the current date. In such an embodiment, the predefined time period described in the previous paragraph is set to a shorter period such as 30 days as opposed to an annual period used in one variation without the UpdateAfter function. In addition, disk system 121 includes a hierarchical list of dependencies among resource information files used to establish a proper sequence beginning with level zero files (resource information files making no reference to other resource information files), level one files (resource information files making reference to files having a level no greater than level zero), level two files (resource information files making reference to files having a level no greater than level one), and so on. Files are then transferred in the conventional manner.

Note that when a resource information file is replaced, the date value of the internal parameter UpdateAfter may take on a value longer or shorter than the value in the resource information file that was replaced. In this way, a resource manufacturer may provide more frequent automatic updates to selected customers or during selected portions of a product life cycle.

At step 544, administrator 206 provides an indication that an update operation was completed successfully. Such an indication in one variation is a "complete" legend (not shown) sent to local client 112 and presented in a conventional manner beside and in addition to legend 617.

The foregoing description discusses preferred embodiments of the present invention, which may be changed or modified without departing from the scope of the present invention. For example, in alternate variations, additional logical operators including logical-not, exclusive-or, numerical greater-than, character-canonical-order, and the like are available for use in conditional expressions. Further, in an alternate variation, file system 200 is organized with two parallel branch directory structures under ADMIN_LIB 210. The first branch includes device (or resource) directories for resource information files only. The second branch includes device directories for ".gif" files only. Separation of files of different types aids file maintenance operations.

In yet another alternate variation, inheritance is dictated in addition or alternately by the position of a resource information file in the hierarchical tree structure of file system 200. In one such variation, a grandparent directory contains printer.glf file 212, a parent directory contains hplj5si.glf file 220 and a child directory for a new model contains file hplj6x.glf. By its position in the tree structure, data structures from files 220 and 212 are inherited by the data structure in file hplj6x.glf, without the "INHERIT" directive such as in record 436.

Without significant modification administrator 206 and file system 200 are used in alternate system configurations. In a first alternate system variation, local server 118 supports communication to additional remote clients. A remote client is similar in structure and operation to local client 112, except that a remote client communicates in a conventional manner with local server 118 without connection to network 114. In another alternate system variation, the functions of local client 112 and local server 118 are combined into one workstation, network 114 being omitted and resource 116 being conventionally coupled to the workstation. Such a variation corresponds to the home office (personal computer) configuration.

Although data structures 314 and 414 have been described as data, in an alternate variation the functional cooperation described above is implemented in a combination of executable code and encapsulated data. In an object oriented implementation of such a variation, a Java Applet object, developed according to conventional techniques in light of the above disclosure, responds to messages inquiring of internal and external parameter values encapsulated with the object.

These and other changes and modifications are intended to be included within the scope of the present invention. While for the sake of clarity and ease of description, several specific embodiments of the invention have been described; the scope of the invention is intended to be measured by the claims as set forth below. The description is not intended to be exhaustive or to limit the invention to the form disclosed. Other variations of the invention will be apparent in light of the disclosure and practice of the invention to one of ordinary skill in the art to which the invention applies.

What is claimed is:

1. A method performed by a server for resource administration, the server coupled to the resource by a network, the server comprising a file system comprising a first file, the first file comprising instructions for performing the method, the method comprising:
   accessing the network to receive identification of the resource;
   accessing a second file in accordance with the identification;
   interpreting a record read from the second file, the record comprising indicia of an external parameter, indicia of an address, indica of an expected value, and indicia of a constant, indicia of the external parameter being absent from the instructions of the first file;
   sending the address via the network to obtain a message, the resource providing the message in response to the address;
   if the message corresponds to the indicia of the expected value, identifying a memory in accordance with the indicia of the external parameter and storing a value in the memory in accordance with the indicia of the constant; and
   reporting status of the resource in accordance with the value.

2. The method of claim 1 wherein the step of reporting further comprises sending status of the resource to a workstation coupled to the network for presentation by a browser on the workstation.

3. The method of claim 1 wherein the file system further comprises a directory name and the step of accessing the second file further comprises identifying the directory name in accordance with the identification.

4. A method performed by a server for resource administration, the server coupled to the resource by a network, the server comprising a file system comprising a first file, the first file comprising instructions for performing the method, the method comprising:
   accessing the network to receive identification of the resource; and
   accessing a second file in accordance with the identification;
   interpreting a first record read from the second file, the first record comprising indicia of a reference;
   accessing a third file in accordance with the reference;
   interpreting a second record read from the third file, the second record comprising indicia of an external parameter, indicia of an address, indicia of an expected value, and indicia of a constant, the indicia of the external parameter being absent from the instructions of the first file;
   sending the address via the network to obtain a message, the resource providing the message in response to the address;
   if the message corresponds to the indicia of the expected value, identifying a memory in accordance with the indicia of the external parameter and storing a value in the memory in accordance with the indicia of the constant; and
   reporting status of the resource in accordance with the value.

5. The method of claim 1 wherein the step of accessing the second file further comprises:
   accessing a third file from a second server coupled to the network; and
   updating the record in accordance with the third file before interpreting the record.

6. A data storage medium comprising machine readable indicia recorded on the medium, the indicia comprising:
   a. a file system comprising a first filename and a second filename;
   b. a first file, identified by the first filename, the first file comprising a description of a status of a resource; and
   c. a second file, identified by the second filename, the second file comprising indicia of an external parameter, indicia of an address, indicia of an expected value, and indicia of a constant, the address for obtaining a message from the resource, and the constant for determining the first filename for reporting the description of the status of the resource in accordance with the indicia of the external parameter when the message corresponds to the indicia of the expected value.

7. The medium of claim 6 wherein the second file comprises a plurality of records, each record respectively comprising indicia of an external parameter, indicia of an address, indicia of an expected value, and indicia of a constant, the plurality arranged for sequential search for desired indicia of the external parameter.

8. The medium of claim 6 wherein the second file further comprises a conditional expression, the conditional expression supplying a second address and a value, the second address for obtaining a second message from the resource, the conditional expression for identifying the indicia of the external parameter when the second message compares favorably with the value.

9. The medium of claim 8 wherein the conditional expression is preceded by a header having a predetermined value for use by the program to access the conditional expression.

10. The medium of claim 8 wherein the second file further comprises a second conditional expression identified by the indicia of the external parameter.

11. The medium of claim 10 wherein the second file comprises a record comprising the second conditional expression and the indicia of the address.

12. The medium of claim 6 wherein the second file further comprises a string, identified by the indicia of the external parameter, the string for identifying a second description of the status of the resource.

13. The medium of claim 6 wherein the description comprises a graphics data format.

14. The medium of claim 13 wherein the medium further comprises other data comprising the graphics data format for combination with the description.

15. A data storage medium for use in a computer system to assist a user to accomplish at least one of installing, reconfiguring, upgrading, managing, and monitoring operation of a resource of the computer system, the medium comprising machine readable indicia recorded on the medium, the indicia comprising:
   a. a file system comprising a first, a second, and a third filename;
   b. a first data structure, identified by the first filename, that supplies a first external parameter to a provided resource administration program for determining the second filename, the program developed without foreknowledge of the first external parameter;

c. a second data structure, identified by the second filename, that supplies a second external parameter and an address for obtaining a message from the resource at the address; and d. a file, identified by the third filename, that supplies to the program a description of a status of the resource, the third filename identified by the second external parameter in response to the message, the program for reporting the status responsive to the description, wherein reporting facilitates at least one of installing, reconfiguring, upgrading, managing, and monitoring operation of the resource.

16. The medium of claim 15 wherein the first data structure and the second data structure are accessed by the program by sequential search.

17. The medium of claim 15 wherein the second data structure comprises a conditional expression, the conditional expression supplying a second address and a value to the program for obtaining a second message from the resource at the second address, the conditional expression for supplying the description when the second message compares favorably with the value.

18. The medium of claim 17 wherein the conditional expression further comprises a logical operator.

19. The medium of claim 15 wherein the data structure further comprises a string, identified by the external parameter, that supplies to the program a second description of the status of the resource, the program for reporting the status in further response to the second description.

20. The medium of claim 15 wherein the description comprises a graphics data format.

21. A method performed by a server for resource administration, the server comprising a file system comprising a first file, the first file comprising instructions for performing the method, the method comprising:

sending a first message to obtain an identification of a resource, the identification provided by the resource for facilitating access to a second file, sending accomplished via a network, the resource providing the first message in response to the address, wherein the server, the network, and the resource are part of a computer system;

accessing the second file in accordance with the identification of the resource to obtain a first conditional expression, the second file comprising a data structure, the data structure comprising the first conditional expression, an identification of a feature, a second conditional expression, and an address;

evaluating the first conditional expression to obtain the identification of the feature;

accessing the second file in accordance with the identification of the feature to obtain the second conditional expression;

sending the address to the resource to obtain a second message provided by the resource, the second message comprising a value of a parameter, the second message being provided in response to receiving an address that identifies the parameter;

evaluating the second conditional expression in accordance with the value of the parameter received with the second message; and reporting status of the resource in accordance with evaluation of the second conditional expression.

22. A data storage medium comprising machine readable indicia recorded on the medium, the indicia comprising:

a. a file system comprising a first filename and a second filename;

b. a data structure, identified by the first filename, that supplies a first value and an address to a provided computer program, the program developed without foreknowledge of the first value and the address, the computer program for obtaining a second value from a provided resource, the second value being identified by the address; and c. a file, identified by the second filename, that supplies to the program a description of a status of the resource, the second filename determined in accordance with the first value, the program for reporting the status in accordance with the description and the second value.

23. A data storage medium comprising machine readable indicia recorded on the medium, the indicia comprising:

a. a file system comprising a first, a second, and a third filename;

b. a first data structure, identified by the first filename, that supplies a first value to a provided computer program for determining the second filename, the program developed without foreknowledge of the first value;

c. a second data structure, identified by the second filename, that supplies to the program a second value and an address, the program for obtaining a third value from a provided resource, the third value being identified by the address; and d. a file, identified by the third filename, that supplies to the program a description of a status of the resource, the third filename identified by the second value, the program for reporting the status in accordance with the description and the third value.

24. A method performed by a first server for resource administration, the first server coupled to the resource by a network, the first server comprising a file system comprising a first file, the first file comprising instructions for performing the method, the method comprising:

a. performing a step for accessing the network to receive identification of the resource;

b. performing a step for accessing a second file in accordance with the identification;

c. performing a step for interpreting a record read from the second file, the record comprising indicia of an external parameter, indicia of an address, indicia of an expected value, and indicia of a constant, the indicia of the external parameter being absent from the instructions of the first file;

d. performing a step for sending the address via the network to obtain a message, the resource providing the message in response to the address;

e. if the message corresponds to the indicia of the expected value, performing a step for identifying a memory in accordance with the indicia of the external parameter and storing a value in the memory in accordance with the indicia of the constant; and f. performing a step for reporting status of the resource in accordance with the value.

25. The method of claim 24 wherein the step for reporting further comprises a step for sending status of the resource to a workstation coupled to the network for presentation by a browser on the workstation.

26. The method of claim 24 wherein:
the file system further comprise a directory name; and the step for accessing the second file further comprises a step for identifying the directory name in accordance with the identification.

27. A method performed by a server for resource administration, the server coupled to the resource by a network, the server comprising a file system comprising a first file, the first file comprising instructions for performing the method, the method comprising:

performing a step for accessing the network to receive identification of the resource;

performing a step for accessing a second file in accordance with the identification;

performing a step for interpreting a first record read from the second file, the record comprising indicia of a reference;

performing a step for accessing a third file in accordance with the reference;

performing a step for interpreting a second record read from the third file, the record comprising indicia of an external parameter, indicia of an address, indicia of an expected value, and indicia of a constant, the indicia of the external parameter being absent from the instructions of the first file;

performing a step for sending the address via the network to obtain a message, the resource providing the message in response to the address;

if the message corresponds to the indicia of the expected value, performing a step for identifying a memory in accordance with the indicia of the external parameter and storing a value in the memory in accordance with the indicia of the constant; and performing a step for reporting status of the resource in accordance with the value.

28. The method of claim 24 wherein the step for accessing the second file further comprises:

performing a step for accessing a third file from a second server coupled to the network; and performing a step for updating the record in accordance with the third file before interpreting the record.

29. A programmed product recorded on at least one medium, the product comprising:

a. means for indicating a first filename and a second filename;

b. first means for storing a description of a status of a resource, the first means being identified by the first filename; and c. second means for storing an external parameter, an address, an expected value, and a constant, the address for obtaining a message from the resource, and the constant for determining the first filename for reporting the description of the status of the resource in accordance with the external parameter when the message corresponds to the expected value, the second means being identified by the second filename.

30. The programmed product of claim 29 wherein the second means for storing comprises a plurality of records, each record respectively comprising an external parameter, an address, an expected value, and a constant, the plurality arranged for sequential search for the desired external parameter.

31. The programmed product of claim 29 wherein the second means for storing further comprises a conditional expression, the conditional expression supplying a second address and a value, the second address for obtaining a second message from the resource, the conditional expression for identifying the external parameter when the second message compares favorably with the value.

32. The programmed product of claim 31 wherein the conditional expression is preceded by a header having a predetermined value for accessing the conditional expression.

33. The programmed product of claim 31 wherein the second means for storing further comprises a second conditional expression identified by the external parameter.

34. The programmed product of claim 33 wherein the second means for storing comprises a record comprising the second conditional expression and the address.

35. The programmed product of claim 29 wherein the second means for storing further comprises a string, identified by the external parameter, the string for identifying a second description of the status of the resource.

36. The programmed product of claim 29 wherein the description comprises a graphics data format.

37. The programmed product of claim 36 further comprising other data comprising the graphics data format, the description being arranged for combination with the other data.

38. A programmed product for use in a computer system to assist a user to accomplish at least one of installing, reconfiguring, upgrading, managing, and monitoring operation of a resource of the computer system, the programmed product comprising machine readable indicia recorded on at least one medium, the programmed product comprising:

a. means for indicating a first, a second, and a third filename;

b. first means for supplying a first external parameter to a provided resource administration program for determining the second filename, the resource administration program developed without foreknowledge of the first external parameter, the first means being identified by the first filename;

c. second means for supplying a second external parameter and an address for obtaining a message from the resource at the address, the second means being identified by the second filename; and d third means for supplying to the resource administration program a description of a status of the resource, the third means for supplying being identified by the third filename, the third filename identified by the second external parameter in response to the message, the resource administration program for reporting the status responsive to the description, wherein reporting facilitates at least one of installing, reconfiguring, upgrading, managing, and monitoring operation of the resource.

39. The programmed product of claim 38 wherein the first means for supplying and the second means for supplying are accessed by the resource administration program by sequential search.

40. The programmed product of claim 38 wherein the second means for supplying comprises a conditional expression, the conditional expression supplying a second address and a value to the resource administration program for obtaining a second message from the resource at the second address, the conditional expression for supplying the description when the second message compares favorably with the value.

41. The medium of claim 40 wherein the conditional expression further comprises a logical operator.

42. The medium of claim 38 wherein the second means for supplying further comprises a string, identified by the external parameter, that supplies to the resource administration program a second description of the status of the resource, the resource administration program for reporting the status in further response to the second description.

43. The medium of claim 38 wherein the description comprises a graphics data format.

44. A method performed by a server for resource administration, the server comprising a file system comprising a first file, the first file comprising instructions for performing the method, the method comprising:

performing a step for sending a first message to obtain an identification of a resource provided by the resource for facilitating access to a second file, the step for sending accomplished via a network, the resource providing the first message in response to the address, wherein the server, the network, and the resource are part of a computer system;

performing a step for accessing the second file in accordance with the identification of the resource to obtain a first conditional expression, the second file comprising a data structure, the data structure comprising the first conditional expression, an identification of a feature, a second conditional expression, and an address;

performing a step for evaluating the first conditional expression to obtain the identification of the feature;

performing a step for accessing the second file in accordance with the identification of the feature to obtain the second conditional expression;

performing a step for sending the address to the resource to obtain a second message provided by the resource, the second message comprising a value of a parameter, the second message being provided in response to receiving an address that identifies the parameter;

performing a step for evaluating the second conditional expression in accordance with the value of the parameter received with the second message; and performing a step for reporting status of the resource in accordance with evaluation of the second conditional expression.

45. A programmed product comprising machine readable indicia recorded on at least one medium, the programmed product comprising:

a. means for indicating a first filename and a second filename;

b. first means for supplying a first value and an address to a provided administrator program, the administrator program developed without foreknowledge of the first value and the address, the administrator program for obtaining a second value from a provided resource, the second value being identified by the address, the first means being identified by the first filename; and c. second means for supplying to the administrator program a description of a status of the resource, the second means being identified by the second filename, the second filename determined in accordance with the first value, the administrator program for reporting the status in accordance with the description and the second value.

46. A programmed product comprising machine readable indicia recorded on at least one medium, the programmed product comprising:

a. means for indicating a first, a second, and a third filename;

b. first means for supplying a first value to a provided administrator program for determining the second filename, the administrator program developed without foreknowledge of the first value, the first means being identified by the first filename;

c. second means for supplying to the program a second value and an address, the administrator program for obtaining a third value from a provided resource, the third value being identified by the address, the second means being identified by the second filename; and d. third means for supplying to the administrator program a description of a status of the resource, the third means being identified by the third filename, the third filename identified by the second value, the administrator program for reporting the status in accordance with the description and the third value.

* * * * *